United States Patent [19]
Serenko et al.

[11] Patent Number: 5,989,424
[45] Date of Patent: Nov. 23, 1999

[54] WATER FILTRATION CARTRIDGE

[75] Inventors: Paul Serenko, Allenford; Jim Reading, Paris; Gerry Morgenroth, Pickering; Roy Matsushita, Sunderland, all of Canada

[73] Assignee: Matscorp Ltd., Markham, Canada

[21] Appl. No.: 08/930,636

[22] PCT Filed: Apr. 4, 1996

[86] PCT No.: PCT/CA96/00209
  § 371 Date: Oct. 6, 1997
  § 102(e) Date: Oct. 6, 1997

[87] PCT Pub. No.: WO96/31440
  PCT Pub. Date: Oct. 10, 1996

[30] Foreign Application Priority Data

Apr. 7, 1995 [CA] Canada ................................. 2146609

[51] Int. Cl.⁶ ................................................. C02F 9/00
[52] U.S. Cl. .................................... 210/266; 210/282
[58] Field of Search .................... 210/85, 232, 266, 210/282

[56] References Cited

U.S. PATENT DOCUMENTS

| | | | |
|---|---|---|---|
| 4,764,274 | 8/1988 | Miller | 210/282 |
| 4,828,698 | 5/1989 | Jewel et al. | 210/282 |
| 4,895,648 | 1/1990 | Hankammer | 210/232 |
| 5,049,272 | 9/1991 | Nieweg | 210/266 |

FOREIGN PATENT DOCUMENTS

| | | | |
|---|---|---|---|
| 0 340 382 | 11/1989 | European Pat. Off. | B01J 47/00 |
| 2 197 647 | 5/1988 | United Kingdom | C02F 1/28 |
| WO 89 00977 | 2/1989 | WIPO | C02F 1/28 |

*Primary Examiner*—Ivars Cintins
*Attorney, Agent, or Firm*—Patrick J. Hofbauer

[57] ABSTRACT

The invention relates to a replaceable filter cartridge for a use in a water filtration device. The cartridge has a substantially frustoconical vessel member defining a vertical axis with the vessel member having a screen-like end wall portion at the lower end thereof, which end wall portion permits water to flow therethrough. A hollow substantially frustoconical cover member is attached to the vessel member in coaxial alignment with the vertical axis. The cover member has a multiplicity of vertically oriented water entry flow slots. A non-planar compressible first mass of filtration material is frictionally retained within said cover member and a non-planar compressible second mass of filtration material is positioned within said vessel member in juxtaposed relation to said end-wall member. A granular purifying agent, which is insoluble in water, is contained within said vessel member, and layered upon the second mass of filtration material. A split support ring, having a series of upwardly, radially inwardly slanted projections is positioned within the cover member, in supported relation upon the rim portion of the cover member to contain the non-planar compressible first mass of filtration material in compressed relation within the cover member.

8 Claims, 4 Drawing Sheets

WATER FILTRATION CARTRIDGE

This application is the United State national application, filed under 35 U.S.C. §371, of PCT Application No. PCT/CA96/00209, filed Apr. 4, 1996.

FIELD OF THE INVENTION

The present invention relates to a filtration cartridge to be used with a hand-held water filtration system, the filtration cartridge being adapted to permit water to flow therethrough, and containing a granular purifying agent which is insoluble in water.

BACKGROUND OF THE INVENTION

Various hand-held devices are known which utilize a granular purifying agent, such as activated charcoal and/or an ion exchange material for the purification of water. Examples of such devices are: U.S. Pat. Nos. 4,306,971 (Hankammer); 4,895,648 (Hankammer); 4,969,996 (Hankammer); and, 5,049,272 (Nieweg).

Generally, these devices comprise a large funnel-shaped member to hold and channel the water to be purified, a removable filtration cartridge placed in the flow channel of the funnel-shaped member, and a collection beaker for the purified water. The filtration cartridge is ordinarily constructed to allow the water to flow therethrough, and contains the aforementioned granular purifying agent and/or ion exchange material. These filtration cartridges are typically constructed from inexpensive plastics materials and are designed to be discarded after the granular purifying agent loses its effectiveness, typically after about a month of normal household usages (i.e., after about 100 liters of water have been filtered).

The rate of flow of water through the filter cartridge is critical for effective water purification. It is necessary to contain the water within the filtration cartridge for a sufficient time to allow for ion exchange and filtration to occur, yet if the flow rate through the cartridge is too slow, then an insufficient volume of water will be purified, in a time frame which is satisfactory to the user of the filtration system. Certain known filtration cartridges, such as the subject of U.S. Pat. No. 4,895,648 (Hankammer) [equivalent to EP-A-0340382] and published UK Patent Application No. GB-A2 197 647 (Clarke et al.), rely upon an array of water flow openings which are sufficiently small to trap the granular purifying material within the cartridge, while allowing water to pass therethrough. There are disadvantages connected with such a configuration. The size of the water flow openings is necessarily very small in order to trap the granular purifying agent within the cartridge; this sizing results in significant time lag for overall water filtration, since only a small volume of water can pass through the filtration cartridge openings at a given time. Additionally, there is the potential for particles of the granular purifying agent to become trapped in the water flow openings, blocking them and further reducing flow rates. Further problems develop in relation to the venting of air out of the collection beaker through the filter cartridge. One prior art solution has been to design the filter cartridge for use with a hollow venting tube which protrudes upwardly above the top level of the funnel-shaped channelling member, so as to remain at all times above the level of water in the funnel-shaped channelling member. This system is expensive to manufacture, and is unwieldy to use.

Other known water filtration cartridges have adapted generally planar felt-like plastic or fabric secondary filters positioned adjacent the water flow openings in the top and bottom ends of the cartridge to retain the granular purifying agent, which arrangement permits the use of enlarged water flow openings on the outer housing. Such larger openings in turn permit rapid water flow rates through the filtration cartridge. These cartridges are relatively effective, but are expensive to manufacture and require significant additional engineering of the device in order to vary water flow rates for different use applications. Moreover, the top and bottom secondary filters must be sized differently in order to fit the different top and bottom end dimensions of the filtration cartridge. More particularly, the top secondary filter is typically conical, to correspond to the general shape of the cartridge cap, which cap has been so configured to achieve adequate air ventilation. Accordingly each of the top and bottom secondary filters must be separately manufactured using molds or dies of differing sizes and shapes. Further, it is necessary to use some form of fastening means to secure the secondary filters, most notably the top secondary filter, to the top cap of the filtration cartridge. Plastic welding is sometimes used for this purpose, as disclosed in U.S. Pat. No. 5,049,272 (Nieweg). This step further complicates assembly and increases manufacturing costs. Alternatively, the use of top and bottom secondary filters constructed of light, fluffy, loosely packed fibrous matter comprising commingled, non-woven fibres of significant length relative to their diameter has been proposed in published PCT Application Ser. No. WO-A-89/00977. However, the design of this cartridge does not have the conventional conical cap design mentioned above, which design has become an industry standard, and no means are proposed in this reference to hold the top secondary filter within the cap to facilitate assembly as aforesaid.

The above mentioned prior art systems using generally planar felt-like plastic or secondary filters additionally suffer from the following disadvantage. As the filtration cartridges are used over time, settling out and packing of fine particles of the granular purifying agent tends to occur, particularly on the secondary filter adjacent the bottom end of the cartridge. This settling out of fine particulate on the secondary filters has the effect of clogging the secondary filters and thereby slowing down the flow rate of the filtration cartridge over time. The effect is more pronounced if the cartridge is permitted to dry out between uses. Such slowing down of the flow rates is generally undesirable and irritating to the end user.

SUMMARY OF THE INVENTION

It is a general object of the present invention to overcome the deficiencies in the prior art as identified above.

It is a further object of the present invention to provide an improved water filtration cartridge which is capable of achieving an optimal water flow rate to effectively purify water, while still processing a sufficient volume in a time frame which is acceptable to the end user.

It is yet a further object of this invention to provide an improved water filtration cartridge which will substantially maintain an optimal design water flow rate over time, and which flow rate will not significantly decrease due to settling out of fine particulate matter on the secondary filters.

It is yet a further object of this invention to provide an improved water filtration cartridge whose components can be manufactured less expensively and assembled more easily than those previously available, and which can be readily altered to vary the design water flow rate without extensive re-engineering or re-tooling of the production molds used to manufacture the body of the cartridge.

In accordance with the present invention there is disclosed an improved water filter cartridge of the type having a substantially frustoconical vessel member defining a vertical axis, said vessel member having a screen-like end wall portion at the lower end thereof, which end wall portion permits water to flow therethrough and a hollow substantially frustoconical cover member attached to said vessel member and coaxial with the vertical axis thereof, said cover member defining an annular rim portion and a first slanted portion extending upwardly and inwardly from said rim portion, and a substantially flat-topped second portion, said first portion having a multiplicity of vertically oriented water entry flow slots arrayed therearound for use in a water filtration device. The improvement comprises having a non-planar compressible first mass of filtration material frictionally retained within the cover member, a non-planar compressible second mass of filtration material positioned within the vessel member in juxtaposed relation to said end-wall portion, with the first and second non-planer masses of filtration material each being constructed from a multiplicity of fine flexible fibres of a substance which is insoluble in water. A granular purifying agent, which is insoluble in water, is contained within said vessel member, and is layered upon the second mass of filtration material. A split support ring, having a series of upwardly, radially inwardly slanting projections is being positioned within the cover member, in supported relation upon the rim portion of the cover member. The non-planer compressible first mass of filtration material is held in compressed relation within the cover member by the split support ring.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

DETAILED DESCRIPTION OF A PREFERRED EMBODIMENT

Figure 1:
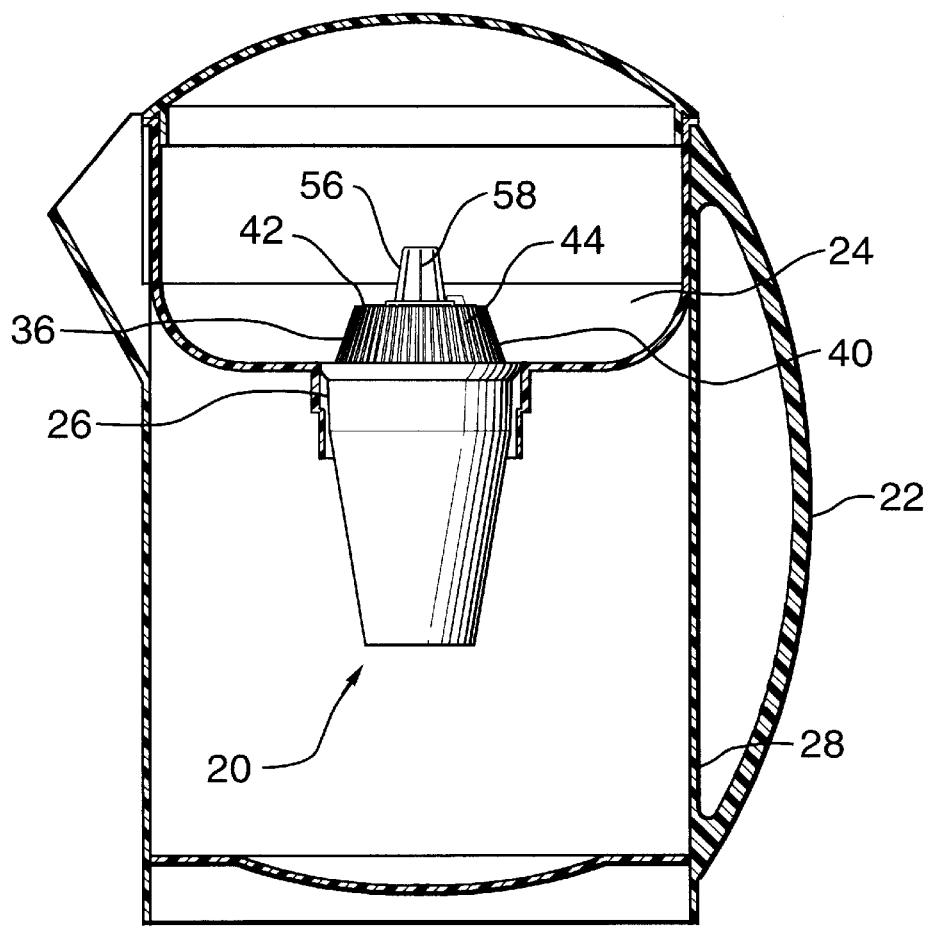
FIG. 1 of the drawings appended hereto is a perspective view of the water filtration cartridge according to the present invention in place in a hand-held water filtration system, which system is shown in section.

Reference will now be made to the drawings, wherein like reference numerals are used in the various Figures to identify analogous structures.

FIG. 1 of the drawings shows a preferred embodiment of a water filtration cartridge according to the invention and generally designated by reference numeral 20. The water filtration cartridge 20 is adapted for use with a hand-held water filtration device 22, which is comprised of a large generally funnel-shaped member 24 adapted to hold and channel the water to be purified. The funnel-shaped member 24 contains a flow channel 26, which channel is sized to support the water filtration cartridge 20. Purification of the water occurs within the water purification cartridge 20, (as described fully below), and the purified water is then collected and held in a collection portion 28.

Figure 2:
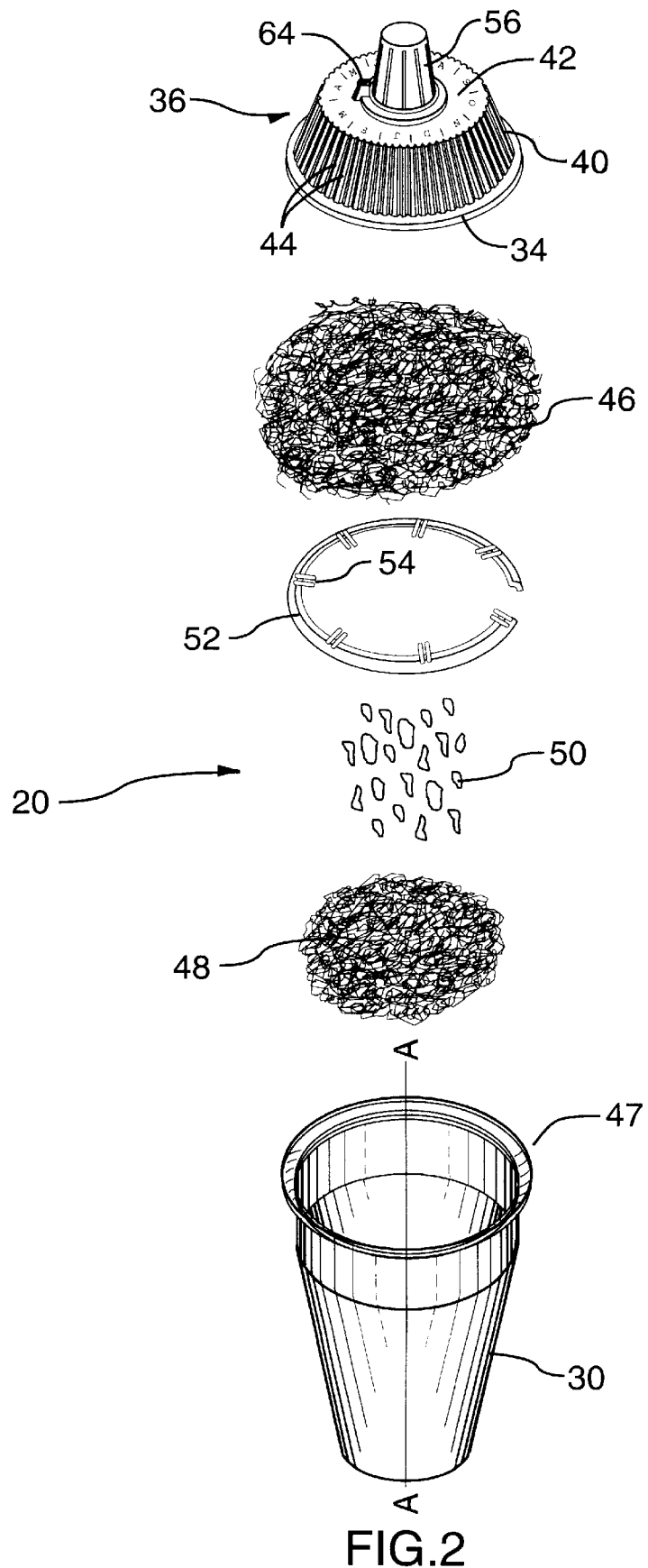
FIG. 2 of the drawings is an exploded perspective view of the water filtration cartridge of FIG. 1.

Referring now to FIG. 2, the water filtration cartridge 20 comprises a member 30, which is preferably substantially frustoconical, and which tapers downwardly, defining a vertical axis A—A. The vessel member 30 has a screen-like end wall portion 32 (best seen in FIG. 3) at its lower end. The screen-like end wall portion 32 permits water to flow out of the vessel member 30. The vessel member 30 has an annular shoulder 47 contiguous with the inner surface 31 of the vessel 30, and positioned adjacent the upper open end 38 of the said vessel member 30. A hollow, substantially frustoconical, cover member 36 is attached to the upper open end 38 of the vessel member 30. The cover member 36, when installed, is coaxial with vessel member 30, and defines an upwardly, inwardly slanted first portion 40 which is contiguous with a substantially flat-topped second portion 42. The upwardly inwardly slanted first portion has a multiplicity of vertically oriented water entry flow slots 44 arrayed therearound in substantially equally spaced orientation.

A non-planar compressible first mass of filtration material 46 is frictionally retained within the cover member 36, by compressible contact with the inner wall surface of the first portion 40 of the cover member 36. The mass is amorphous in shape, analogous to a wad of cotton batting, or a cotton ball, and is comprised of a multiplicity of fine flexible fibres of substance which is insoluble in water. Preferred materials of this type are described below. A non-planar compressible second mass of filtration material 48 is positioned within the vessel member 30 in juxtaposed relation to the screen-like end-wall member 32. The second mass of filtration material 48 is comprised of substantially the same material as the first mass of filtration material 46. A conventional granular purifying agent 50 is contained within the vessel member 30, layered upon the second mass of filtration material 48. The granular purifying agent is ordinarily composed of activated charcoal particles, conventional ion exchange materials well-known in the art, or a combination thereof.

The water purification is accomplished as the water in the top-shaped funnel member 24 is pulled by gravity down through the water flow entry slots 44 of the slanted first portion 40 of cover member 36. The water then passes through the non-planar first mass of filtration material 46, at which point gross filtering occurs. The water then percolates through the granular purifying agent 50, where purification such as the reduction of lead, copper, zinc, chlorine etc. occurs. The particular parameters of the purification will be determined by the composition of the granular purifying agent 50 used in any given application, and may be varied to achieve desired water purification characteristics. The water then passes through the non-planar second mass of filtration material 48, and exits the vessel member 30 by means of the screen-like lower end-wall member 32. The purified water then drops into the collection portion 28, where it is stored for subsequent use.

The non-planar compressible first mass 46 of filtration material is multifunctional. First, as outlined above, some gross filtration, such as the removal of certain particulate matter may occur as the water flows through the first mass 46. More importantly, the first mass 46, together with the second mass 48, trap the granular purifying agent 50 within vessel member 30. Accordingly, the water entry flow slots 44 and the openings in screen-like lower end-wall member 32 can each be of a non-critical size and relatively larger than that encountered in the prior art, since neither of these members 44, 32, perform, in the present invention, the additional function of retaining the granular purifying agent 50. A more rapid flow of water through the water filtration cartridge 20 is thereby permitted. A preferred material for construction of the non-planar compressible first 46 and second 48 masses of filtration material is a non-directional assembly of spun fibres, such as heat-bonded spun polyester (as opposed to chemically bonded spun polyester), although other spun plastics may be usefully employed for this purpose, including spun polyethylene. Also, the initial size of the first 48 and second 48 masses of filtration material may be substantially identical, such that a single inventory thereof for respective insertion into the vessel 30 and the cover member 36 can be maintained. The flexibility and compressibility of the material of the first 46 and second 48 filtration masses means that they can preferably be interchangeably inserted into the cover member 36 and the vessel member 40, thus further simplifying assembly and reducing production costs.

Figure 5:
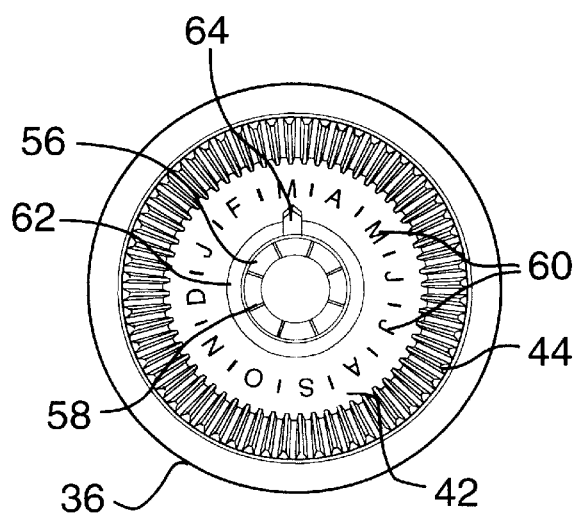
FIG. 5 of the drawings is a top plan view of the water filtration cartridge of FIG. 1, showing detail of a rotatable pointer and calender month symbols.
Figure 3:
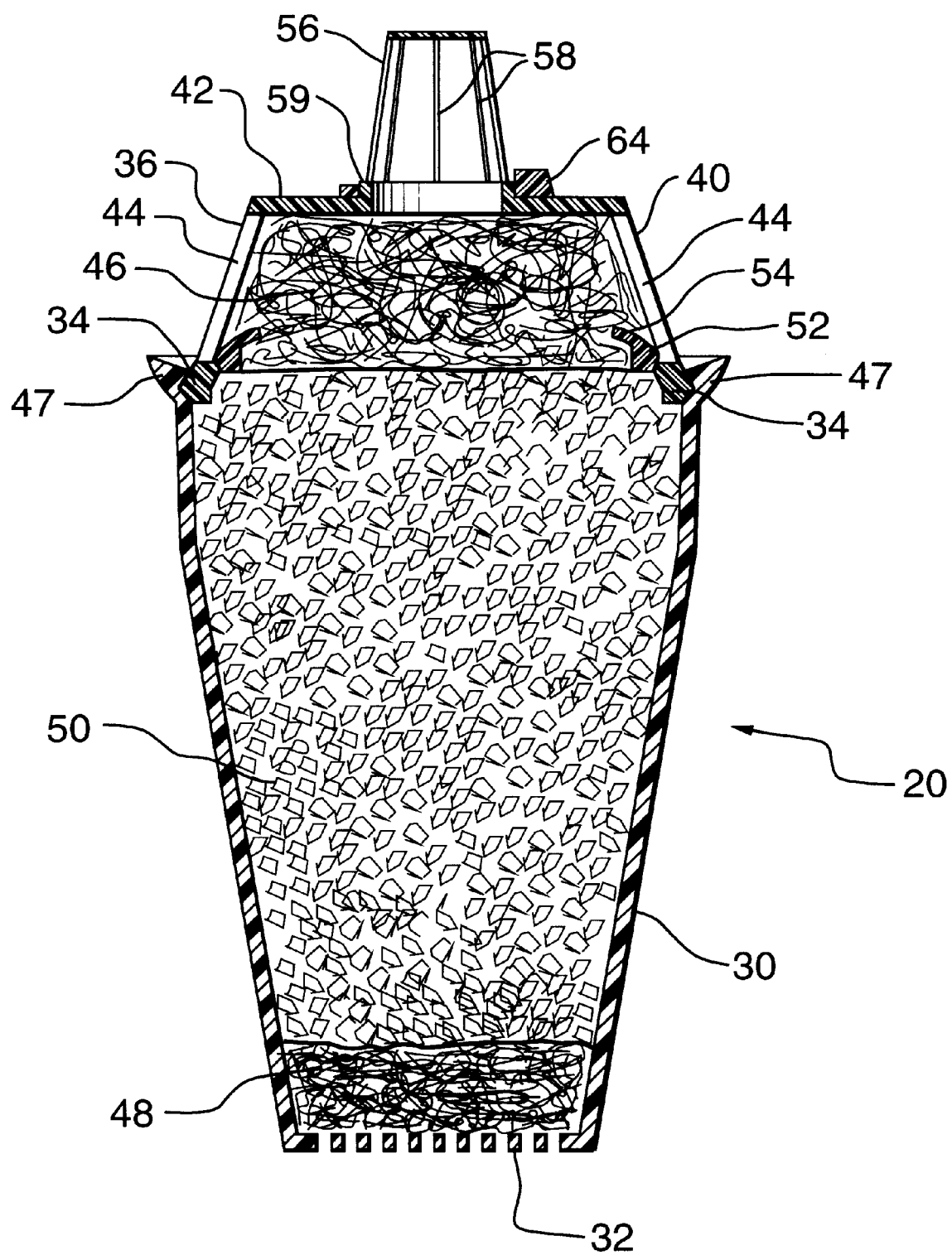
FIG. 3 of the drawings is a vertical mid-line section of the water filtration cartridge of FIG. 1 when the granular purifying agent is wet.
Figure 4:
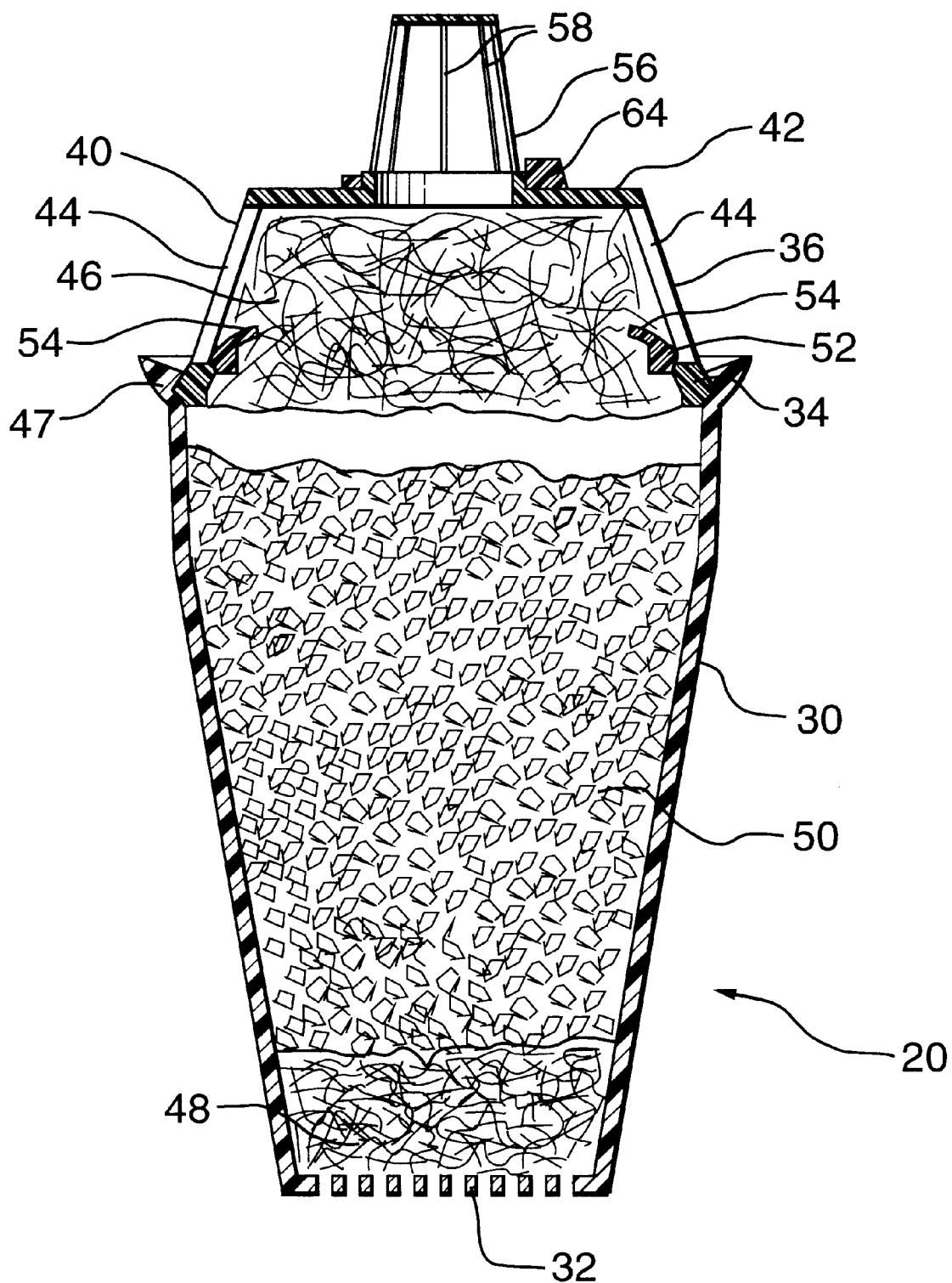
FIG. 4 of the drawings is a view similar to FIG. 3 when the granular purifying agent is dry.

Referring now to FIGS. 3 and 4, the use of the non-planar compressible first mass of filtration material 46 performs a further critical function in the operation of the water filtration cartridge 20. The use of a non-planar compressible first 46 and second 48 masses aid in regulating the flow of water through the water filtration cartridge, as the masses 46 and 48 are able to be compressed to compensate for natural expansion of the granular purifying agent 50, when the agent 50 becomes wet. FIG. 4 shows the relative positioning of the first 46 and second 48 masses and the granular purifying agent 50 when the cartridge is new and dry. In FIG. 5, the granular purifying agent has expanded when wetted, and the first mass 46 has reversibly upwardly compressed into the cover member 36 in response to such expansion. Similarly, the second mass 48 has been downwardly reversibly compressed into the vessel member 30, due to such expansion of the granular purifying agent 50.

Thus, the compression of the first 46 and second 48 masses of filtration material will offset the expansion of the granular purifying agent 50, which occurs as a natural consequence of its being wetted. Moreover, the granular purifying agent 50 contracts when it dries out, back to substantially the same configuration as shown in FIG. 4. Such expansion and contraction of the granular purifying agent 50 together with the general effects of water flowing downwardly through the cartridge 20 will have the effect of depositing a fine dust of carbon particles on the upper surface of the second mass 48 of filtration material. With prior art planar secondary filtration members, such fine particles have no where to go, and tend to accumulate and cake-up on the upper surface of the secondary filter, thereby impeding the flow of water through the secondary filter. In contrast, in the present invention, the cyclical compression and expansion of the first 46 and second 48 masses of filtration material substantially prevents these particles from caking-up, but, rather, assists them to permeate the three-dimensional array of fibres that make up the first 46 and second 48 masses. Thus, the flow rate of the cartridge 20 remains substantially constant throughout the intended useful lifetime of the cartridge, (which lifetime is discussed more fully below). The expansion and contraction of the first mass 46 of filtration material provides a similar function to prevent fouling by the fine carbonate material which settles out from the granular purifying agent 50, but to a lessor overall extent than with the second mass 48, as settling out of such fine particulate matter is predominately in the downward flow direction of the water.

The flow rate of the water filtration cartridge 20 can also be quickly and easily varied to suit different applications by altering the amount and type of the granular purifying agent 50, and by varying the amount of the non-planar compressible first mass 46 of filtration material, without the need, in most cases, of altering the size or configuration of the water entry flow slots 44 or the openings in the screen-like end wall member 32. Thus, no expensive changes to the moulds used to produce the vessel 30 or the cover member 36 need to be made to accommodate such flow rate changes.

A split support ring 52, having a series of upwardly, radially inwardly slanted projections 54, can preferably be used to further improve the ease of assembly of the water filtration cartridge 20 of the present invention. During assembly, the first mass 46 of filtration material is pressed into cover member 36, and then the split support ring 52, which is constructed of resilient plastics material, is radially compressed about the split and inserted into the cover member 36, and thereafter released from said radial compression. The split support ring expands when so released to its original radius within the cover member 36, and is thereby positioned to retain the first mass of filtration material 46 by means of the projections 54 engaging the filters of the first mass 46. With the first mass 46 of filtration material thus retained within the cover member 36, it is a simple matter to snap the cover member 36 into place onto the vessel member (already filled with the granular purifying agent) 30, with the split support ring 52 in retained, supported contact on the rim portion 34 of the cover member 36. During such snapping action, the annular rim portion 34 of the cover member 36 is engaged by the annular shoulder portion 47 of the vessel member 30 in overlain relation, so as to hold said cover member 36 in attached relation to the vessel member 30. Both the cover member 36 and vessel member 30 are preferably constructed of, for example, high density polyethylene having the requisite degree of positional memory. The cover member 36 may be optionally heat welded (not shown) to the vessel member 30, if complete non-removability thereof is desired.

In the preferred embodiment of the water filtration cartridge 20 illustrated, the flat-topped second portion 42 of the cover member 36 has an upwardly tapering frustoconical chimney portion 56, which portion is coaxial with the vertical axis of the vessel member 30. The chimney portion 56 has an array of vertically oriented ventilation slots 58 positioned annularly therearound. The ventilation slots 58 enhance flow of air up through the water filtration cartridge 20, as air is displaced from below the funnel-shaped member 24 by the inflowing water, further enhancing the rate of water flow through the water filtration cartridge 20.

Figure 6:
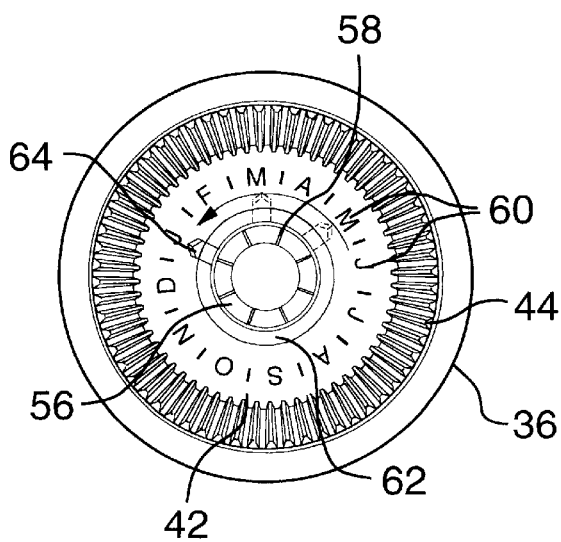
FIG. 6 of the drawings is a view similar to FIG. 5 showing rotation of the pointer in phantom outline.

Conventional granular purifying agents lose their effectiveness, typically after about a month of normal household usage (i.e., filtration of approximately 100 liters of water). In order to assist the user in maintaining a high standard of water purification, the preferred embodiment of the present invention incorporates a reminder system to indicate to the user that it is time to install a new water filtration cartridge into the water filtration device 22. As shown in FIGS. 5 and 6, the reminder system preferably consists of twelve symbols 60 which correspond to the months of the year, positioned on the flat-topped second portion 42 of cover member 36, and radially arrayed from the vertical axis of the cover member 36. A rotatable ring 62 is frictionally secured to the base of chimney portion 56 by an undercut edge 59, said ring 62 having a pointer 64. The user of the filter cartridge can rotate the ring 62 to direct the pointer 64 to indicate, for example, the calender month following the month in which the water filtration cartridge 20 was installed in the water filtration device 22. The user should then periodically check the position of the pointer 64, and when the current calender month matches the letter symbol 60 to which the pointer 64 is directed, the user is reminded that a new water filtration cartridge should be installed. Other indicia, such as lines representing numbers from 1–100, in groups of 5, 10, etc., may alternatively be marked on the flat-topped second portion 42 in place of the twelve symbols 60 shown. In this case, the pointer 64 is advanced one line after each use of the filter cartridge, indicating to the user to replace the cartridge after 100 uses, where the collection portion 24 is configured to hold approximately 1 liter of filtered water.

Other routine variations in dimensions, shaping, choice of materials, arrangement and substitution of parts will occur to those skilled in the art, such that the scope of this invention is limited solely by the scope of the appended claims which follow.

The embodiments of the invention in which an exclusive property or privilege is claimed are defined as follows:

1. In a water filter cartridge of the type having a substantially frustoconical vessel member defining a vertical axis, said vessel member having a screen-like end wall portion at the lower end thereof, which end wall portion permits water to flow therethrough and a hollow substantially frustoconical cover member attached to said vessel member and coaxial with the vertical axis thereof, said cover member defining an annular rim portion and a first slanted portion extending upwardly and inwardly from said rim portion, and a substantially flat-topped second portion, said first portion having a multiplicity of vertically oriented water entry flow slots arrayed therearound for use in a water filtration device, wherein the improvement comprises:

a non-planar compressible first mass of filtration material frictionally retained within said cover member;

a non-planar compressible second mass of filtration material positioned within said vessel member in juxtaposed relation to said end wall portion;

said first and second non-planar masses of filtration material each being constructed from a multiplicity of fine flexible fibres of a substance which is insoluble in water;

a granular purifying agent, which is insoluble in water, contained within said vessel member, and layered upon said second mass of filtration material; and, a split support ring, having a series of upwardly, radially inwardly slanted projections, said split support ring being positioned within the cover member, in supported relation upon said rim portion of said cover member;

wherein, the non-planar compressible first mass of filtration material is held in compressed relation within said cover member by said split support ring.

2. A filter cartridge according to claim 1, wherein said non-planar first and second masses of filtration material are each constructed from a non-directional assembly of spun fibres.

3. A filter cartridge according to claim 2, wherein said spun fibres are plastic fibres.

4. A filter cartridge according to claim 2, wherein said spun fibres are heat-bonded polyester fibres.

5. A filter cartridge according to claim 2, wherein said spun fibres are polypropylene fibres.

6. A filtration cartridge according to claim 1, wherein said first portion of said cover member has an upwardly tapering frustoconical chimney portion, also coaxial with said vertical axis of said vessel member, said upwardly tapering frustoconical chimney portion having an array of vertically oriented vent slots positioned annularly therearound.

7. A filtration cartridge according to claim 6, and additionally comprising a ring member frictionally engaging the base of said upwardly tapering frustoconical chimney portion in encircling movable relation, said ring member having a pointer member extending radially outwardly along said flat-topped second portion in overlying relation, said pointer member being selectively positionable about said vertical axis to point to a plurality of symbols presented on said flat-topped second portion.

8. A filtration cartridge according to claim 1, wherein said vessel member has an annular shoulder contiguous with the inner surface of the vessel member and positioned adjacent an upper open end thereof, which annular shoulder engages said annular rim portion in overlying relation to hold said cover member in attached relation as aforesaid.

\* \* \* \* \*